United States Patent
Singh et al.

(10) Patent No.: US 10,828,772 B2
(45) Date of Patent: Nov. 10, 2020

(54) MULTIDIRECTIONAL LOCOMOTIVE MODULE WITH OMNIDIRECTIONAL BENDING

(71) Applicant: International Institute of Information Technology, Hyderabad, Hyderabad (IN)

(72) Inventors: Akash Singh, Hyderabad (IN); Enna Sachdeva, Hyderabad (IN); Vinay Rodrigues, Hyderabad (IN); Madhava Krishna, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 188 days.

(21) Appl. No.: 16/118,658

(22) Filed: Aug. 31, 2018

(65) Prior Publication Data

US 2020/0070338 A1    Mar. 5, 2020

(51) Int. Cl.
| | |
|---|---|
| *B25J 9/06* | (2006.01) |
| *B25J 9/08* | (2006.01) |
| *B62D 57/00* | (2006.01) |
| *B25J 18/06* | (2006.01) |
| *B25J 5/00* | (2006.01) |

(52) U.S. Cl.
CPC .............. *B25J 9/065* (2013.01); *B25J 9/08* (2013.01); *B25J 5/007* (2013.01); *B25J 18/06* (2013.01); *B62D 57/00* (2013.01)

(58) Field of Classification Search
CPC ..... B25J 9/065; B25J 9/08; B25J 18/06; B25J 5/007; B62D 57/00
See application file for complete search history.

(56) References Cited

U.S. PATENT DOCUMENTS

| | | | |
|---|---|---|---|
| 8,393,422 B1* | 3/2013 | Pensel ................. | B62D 55/075 180/9.46 |
| 2009/0030562 A1* | 1/2009 | Jacobsen ................ | B08B 9/045 701/2 |
| 2010/0030377 A1* | 2/2010 | Unsworth .............. | F16M 11/14 700/245 |
| 2010/0234988 A1* | 9/2010 | Buckingham ........... | B25J 18/06 700/245 |
| 2010/0258362 A1* | 10/2010 | Trimmer ................ | B08B 9/045 180/7.1 |
| 2016/0008989 A1* | 1/2016 | Bakir ...................... | B25J 9/102 74/490.03 |

* cited by examiner

*Primary Examiner* — Prasad V Gokhale

(57) ABSTRACT

A multidirectional locomotive module with omnidirectional bending that is compliant along multiple axis is provided. The locomotive module includes, (A) a first part that includes (i) one or more circular rigid components which are coupled using a two degree of freedom joint, (ii) bending actuator that actuates the two degree of freedom joint enabling bending of the multidirectional locomotive module to an angle ranging from 0 to 90 degrees about a Z-axis in a direction to achieve surface compliance with an external surface, and (B) a second part that is elongated in shape with circular cross-section along a surface length and hemispherical in shape an end portion with a surface that is formed by a power transmission sprocket chain and an arrangement of curved components enabling sideways rolling of the multidirectional locomotive module, also enabling wheeled and legged locomotion in vertical position.

20 Claims, 17 Drawing Sheets

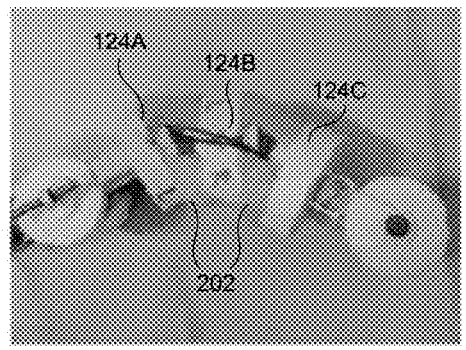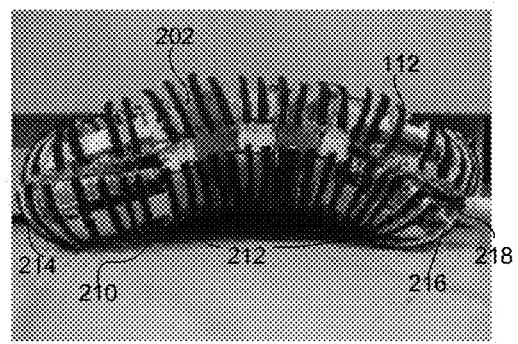
FIG. 2A
FIG. 2B (a) (b) (c)

MULTIDIRECTIONAL LOCOMOTIVE MODULE WITH OMNIDIRECTIONAL BENDING

BACKGROUND

Technical Field

The embodiments herein generally relate to crawling locomotive modules, more specifically, a multidirectional locomotive module with omnidirectional bending and possible different configurations of more than one multidirectional locomotive module with omni directional bending.

Description of the Related Art

There have been articulated locomotive modules existing in art for a while. They can be search and rescue robots, in pipe robots, snake robots etc. The surface compliance for locomotive modules contributes to the functionality and ease of operation, especially on uneven surfaces. The surface compliance of the existing articulated robots for various applications such as search and rescue, manipulation, gripping, etc. is achieved by a cascaded assembly of multiple locomotive modules. This cascading of modules, referred to as a kinematic chain of modules, contributes to the ease of operation by achieving compliance on uneven surface which enhances its traction. Moreover, the Crawling motion of the articulated robots is achieved by the simultaneous Crawling motion of each of the cascaded module, which requires each module to have its own driving actuator. Also, the cascaded arrangement of the modules in the articulated robot is realized such that at least one end of each module is configured to the one end of the adjacent module via an external joint which is connected to an actuator and activated by an actuator. Hence, the cascading leads to an increase in the number of actuators since each module consists of its own driving actuators, and the external joint connected to actuators consume extra space outside the module, which leads to an increase in the size and weight of the robot. Bulky and heavy module reduces the functionality to navigate constrained spaces during search and rescue, also limits its other possible operations, such as taking sharp turns in tight spaces. Moreover, the existing articulated modules don't achieve crawling motion and surface compliance simultaneously. Also, they are unable to achieve multi axial bending along their axis thus limiting the degree of movement possible of the articulated module.

Also, several robots with hybrid locomotion modes exist in the art. But they incorporate conventional tank like crawler module, which supports crawling motion along one axis only. These types of arrangements do not provide omnidirectional crawling motion, the one in which the robot can move in any direction without changing its orientation.

Accordingly, there remains a need for a functionally and structurally compliant locomotive module for various operations.

SUMMARY

Omnidirectional Bending: The two degree of freedom joints within the module enables the bending of the module to a direction about the Z axis.

In one aspect, a multidirectional locomotive module with omnidirectional bending that is compliant along multiple axis includes, a first part that includes (i) a first circular rigid component, a second circular rigid component and a third circular rigid component, wherein the first circular rigid component is coupled to the second circular rigid component using a first two degree of freedom joint, wherein the second circular rigid component is coupled to the third circular rigid component using a second two degree of freedom joint, wherein the first two degree of freedom joint is aligned along the X and Y axes and the second two degree of freedom joint is aligned along the Y-axis and the X-axis of the locomotive module; (ii) a first pair of bending actuators that are connected to the first two degree of freedom joint and a second pair of bending actuators that are connected to the second two degree of freedom joint, wherein the first and the second pair bending actuators receive a signal from an external device or a sensing module when the locomotive module is in operation and actuates the first or the second two degree of freedom joint that enables bending of the locomotive module to an angle ranges from 0 to 90 degrees about a Z-axis in a direction to achieve (a) surface compliance with external surface when the locomotive module is in a crawling position along the X-axis or (b) bending to an angle in a range of 0 to 90 degrees in a direction when the locomotive module is in a vertical locomotion position; and (iii) a sprocket wheel;

a second part that is elongated in shape with circular cross-section along a length and hemispherical in shape at a first end and a second end of the locomotive module, wherein the second part includes a sprocket chain that runs over the sprocket wheel and curved components coupled with the sprocket chain, wherein the sprocket chain is compliant along the X-axis, the Y-axis and the Z-axis, wherein the curved components includes curvature that in turn, along with the sprocket chain form circular cross-section of the second part along the length and hemispherical shape at the first end and the second end.

In an embodiment, the locomotive module includes a driving actuator, wherein the driving actuator enables a movement of the sprocket wheel in clockwise or anticlockwise motion, which in turn enables a movement of the curved components with the sprocket chain in a rotation over the first end, the surface length and the second end to enable, (A) crawling of the locomotive module in (a) forward direction when the sprocket wheel moves in clockwise motion or (b) backward direction when the sprocket wheel moves in anticlockwise motion, when the module is in crawling position with the length in contact with external surface along the X-axis; or (B) wheeled locomotion of the locomotive module in (a) forward direction when the sprocket wheel moves in clockwise motion or (b) backward direction when the sprocket wheel moves in anticlockwise motion, when the locomotive module is in vertical locomotion position and the first end or the second end is a wheeled end.

In an embodiment, the multidirectional locomotive module with omnidirectional bending includes a rolling actuator which facilitates rolling of the locomotive module perpendicular to the surface length.

In an embodiment, the multidirectional locomotive module includes a linear screw actuator to optimize tension in the sprocket chain when the locomotive module is in a bent surface compliant position, to enable forward and backward crawling motion of the locomotive module.

In an embodiment, the multidirectional locomotive module includes a compliant component, wherein the compliant component is adapted between the first circular rigid component and the second circular rigid component or the third circular rigid component.

In an embodiment, the multidirectional locomotive module includes the compliant component which is rubber, spring or silicone.

In an embodiment, the multidirectional locomotive module includes the curved components that include protrusions to provide added traction.

In an embodiment, the multidirectional locomotive module includes the sprocket chain which includes the curved components with attachments for surface locomotion, wherein the chain is made of a cascading vertebrae arrangement which includes a first vertebrae with a first outer surface and a first inner surface and a second vertebrae with a second outer surface and a second inner surface, wherein the second outer surface of a second vertebra is coupled to a first inner surface of the first vertebra with two degrees of bending up to the angle of 90 degrees, wherein the first and second vertebrae have rollers and precision grooves to facilitate two degrees of freedom bending of the sprocket chain wherein the sprocket chain passively complies to the omnidirectional bending of the locomotive module to enable high traction motion in bent position.

In an embodiment, the multidirectional locomotive module assembly comprises more than one multidirectional locomotive module with omnidirectional bending, wherein the assembly enables hybrid locomotion modes based on the orientation of the locomotive modules.

In an embodiment, the multidirectional locomotive module assembly includes a multidirectional locomotive module with omnidirectional bending wherein the first end of the module is a wheel end, to enable wheeled movement in backward and forward direction with the multidirectional locomotive module with omnidirectional bending in the vertical locomotion position.

In an embodiment, the multidirectional locomotive module assembly includes a first multidirectional locomotive module, wherein at least one end of the module is coupled to a second multidirectional locomotive module along a longitudinal axis to facilitate a set of forward and backward crawling, omni directional compliant locomotion, and sideways rolling locomotion when the multidirectional locomotive module is in contact with external surface along the length.

In an embodiment, the multidirectional locomotive module assembly facilitates a switch between a first longitudinal position and a second vertical position, wherein the first longitudinal position enables forward and backward crawling, omnidirectionally compliant locomotion along the length and sideways rolling locomotion perpendicular to the length and the second vertical position enables set of omnidirectional bending, legged and wheeled locomotion.

In an embodiment, the multidirectional locomotive module assembly includes a plurality of the multidirectional locomotive module with omnidirectional bending; and an external actuator, wherein the external actuator is coupled with the first end or the second end of the plurality of multidirectional locomotive module with omnidirectional bending to enable a holonomic motion.

In an embodiment, the multidirectional locomotive module assembly includes a plurality of a multidirectional locomotive module coupled to each other at the first end or the second end to enable a backward & forward motion along the length, bending along multiple axis, and a rolling motion along the axis perpendicular to the length to enable a snake robot assembly.

In an embodiment, the multidirectional locomotive module assembly includes a plurality of a locomotive modules coupled to each other at the first end or the second end with at least one compliant link to enable a backward & forward crawling locomotion, a bending, and a rolling motion to enable an in-pipe climbing robot arrangement, wherein at least one of the 2-degree of freedom joints of the plurality of locomotive modules is actuated wherein the actuation of the two degree of freedom joint enables the surface compliance of the assembly according to a direction and a curvature of a pipe, in turn enables the assembly to take sharp turns in small diameter pipes.

In an embodiment, the multidirectional locomotive module is a humanoid prosthetic limb.

In an embodiment, the multidirectional locomotive module assembly is a tree climbing robot assembly or an out pipe climbing robot assembly.

In an embodiment, the multidirectional locomotive module assembly includes a prosthesis with the multidirectional locomotive module with omnidirectional bending acting as a gripper.

In an embodiment, the multidirectional locomotive module assembly is a reconfigurable search and rescue robot assembly.

In an embodiment, the multidirectional locomotive module assembly is a pipe leakage detection robot assembly.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2A is an exemplary view of cascading compliant-rigid components of an omnidirectionally bendable multi-directional locomotive module showing bending of the module in an embodiment herein;

FIG. 2B is an exemplary view of cascaded arrangement of compliant structure of omnidirectionally bendable multidirectional locomotive module with circular rigid components to provide a continuous pathway for curved components and chain assembly in an embodiment herein;

DETAILED DESCRIPTION OF DRAWINGS

Figure 1:
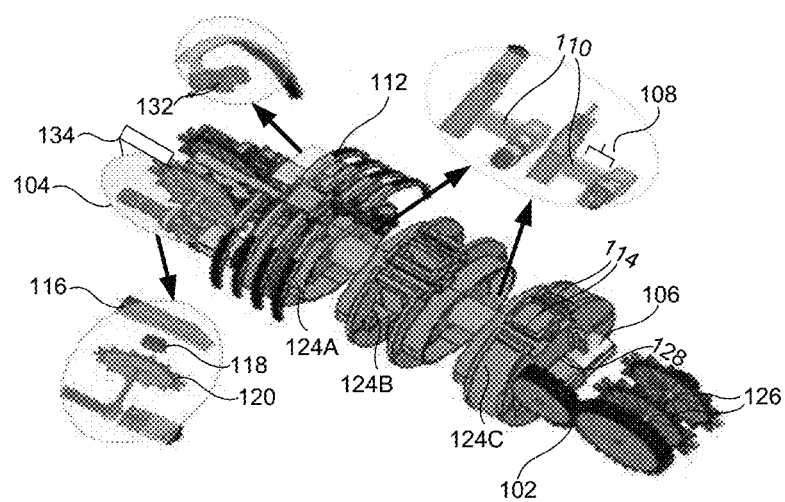
FIG. 1 is an exploded view of an omnidirectionally bendable multi-directional locomotive module according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The purpose of the present omnidirectionally bendable multidirectional locomotive module is that it enables compliance within the crawler module which achieves high maneuverability and adaptability on an uneven surface. The omnidirectional bending is realized by an arrangement of two independent one degree of freedom joints aligned at 90 degrees with respect to each other to comply in the desired direction for the module. The omnidirectionally bendable multidirectional locomotive module further provides an additional advantage over conventional crawler module since it possesses an extra degree of freedom to facilitate sideways rolling motion, which is characterized by its circular cross-section, in addition to forward and backward crawling motion.

Referring now to the drawings and more particularly FIG. 1 to FIG. 14, where similar reference characters denote corresponding features consistently throughout the figures, they are shown preferred embodiments.

Definitions

Holonomic refers to the relationship between controllable and total degrees of freedom of a robot. If the controllable degree of freedom is equal to total degrees of freedom, then the robot is said to be Holonomic.

Traction is the force used to generate motion between a body and a tangential surface, through the use of dry friction.

Omnidirectional Bending: The two degree of freedom joints within the module enables the bending of the bending of the module in any direction about the Z axis.

FIG. 1 is an exploded view of an omnidirectionally bendable multi-directional locomotive module in an embodiment herein. The omnidirectionally bendable multi-directional locomotive module includes a pair of power transmission sprocket chains on each end, one power transmission sprocket chain on each end on each side of a chassis (128) driven by a driving actuator (106) over a sprocket wheel (126) which provides driving motion in forward and backward direction when the omnidirectionally bendable multi-directional locomotive module is in horizontal configuration, and wheeled motion when the omnidirectionally bendable multi-directional locomotive module is in vertical configuration. The omnidirectionally bendable multi-directional locomotive module includes an arrangement of spur gear (102), a tensional mechanism (104), two or more circular rigid components (124A), (124B) and (124C), the driving actuator (106), a first one degree of freedom joint (110A) coupled rotationally with a second one degree of freedom joint (110B) with an off-set distance (108), in turn achieving a first two degree of freedom joint between the two circular rigid components (124A), (124B) and (124C). The two or more circular rigid components (124A). (124B) and (124C) and the pair of power transmission sprocket chains with an arrangement of curved components (112). The arrangement of curved components (112) is coupled with the pair of power transmission sprocket chains, with attachments (132) on each side. There is a pathway (114) for the pair of power transmission sprocket chains with the arrangement of curved components (112) over the two or more circular rigid components (124A) (124B) and (124C). The tensional mechanism (104) comprises a slider (116), a bearing (118), a tensional sprocket (120) and a linear actuator. The arrangement of curved components (112) coupled with the pair of power transmission sprocket chains run all around the aforementioned components one on each side of the chassis (128) enabling a circular cross-section of the omnidirectionally bendable multi-directional locomotive module. The movement of the pair of power transmission sprocket chains with the arrangement of curved components (112) enables backward and forward crawling locomotion. When the driving actuator (106 moves the pair of power transmission sprocket chains in clockwise rotation, the pair of power transmission sprocket chains with the arrangement of curved components (112) moves in clockwise direction over a first end, surface length and over a second end in rotation, in turn enabling movement of the omnidirectionally bendable multidirectional locomotive module in forward direction. When the driving actuator (106) moves the pair of power transmission sprocket chains in anti-clockwise rotation, the pair of power transmission sprocket chains with the arrangement of curved components (112) moves in anti-clockwise direction over the first end, surface length and over the second end in rotation, in turn enabling movement of the omnidirectionally bendable multidirectional locomotive module in backward direction. The first one degree of freedom joint (110A) and the second one degree of freedom joint (110B) activated by a bending actuator between the two or more circular rigid components (124A). (124B) and (124C) enabling omnidirectional bending of the omnidirectionally bendable multi-directional locomotive module at the joint when actuated. The omnidirectional bending enables the omnidirectionally bendable multi-directional locomotive module to traverse uneven surface as the omnidirectionally bendable multi-directional locomotive module can bend to the required direction in required degree adjusting to the surface unevenness. An external (134) along with circular cross section enables rolling of the omnidirectionally bendable multi-directional locomotive module in direction perpendicular to the surface of the omnidirectionally bendable multi-directional locomotive module. The tensional mechanism (104) adjusts tension in the pair of power transmission sprocket chains when the omnidirectionally bendable multi-directional locomotive module is in bent configuration to maintain optimum tension in the arrangement of curved components (112) coupled with the pair of power transmission sprocket chains to enable backward and forward crawling locomotion of the omnidirectionally bendable multi-directional locomotive module when one or more bending actuators are activated achieving omnidirectional compliant locomotion, to traverse an uneven surface.

FIG. 2A is an exemplary view of cascading compliant-rigid structure of an omnidirectionally bendable multi-directional locomotive module showing bending of the module in an embodiment herein. When one or more bending actuators are activated in turn bending the omnidirectionally bendable multidirectional locomotive module. The curvature of the bend module is obtained by rotation of the two or more circular rigid components (124A), (124B) and (124C) and compliant components (202) that comply passively with the bent omnidirectionally bendable multi-directional locomotive module. The structure of the bent omnidirectionally bendable multidirectional locomotive module includes a first circular rigid component (124A) a second circular rigid component (124B), and a third circular rigid component (124C), in curvature of the bent omnidirectionally bendable multidirectional locomotive module along with the compliant components (202) in a cascading arrangement.

FIG. 2B is an exemplary view of cascaded arrangement of the compliant components (202) of the omnidirectionally bendable multidirectional locomotive module with the two or more circular rigid components (124A), (124B) and (124C) to provide a continuous pathway for the arrangement of curved components (112) and a pair of power transmission sprocket chains (218) assembly in an embodiment herein. The arrangement of curved components (112) along with the pair of power transmission sprocket chains (218) forming a surface (210 of the omnidirectionally bendable multidirectional locomotive module that includes a surface length (212), a first end (214) and a second end (216). In an embodiment, the surface has a cylindrical body along the surface length (212) and a hemispherical body at the first end (214) and the second end (216).

Figure 3:
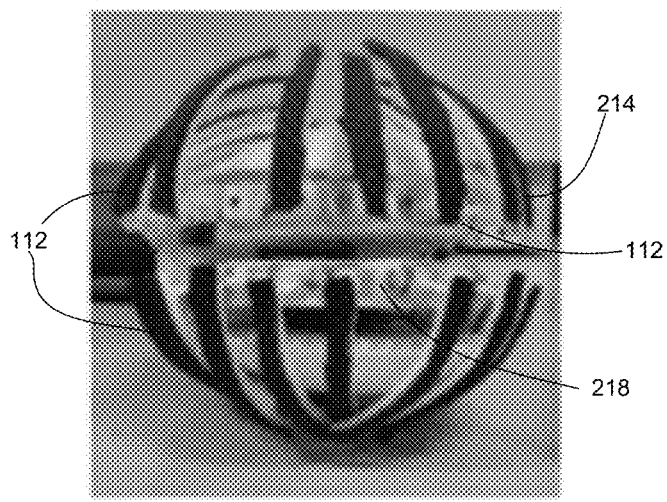
FIG. 3 is an exemplary view of a circular cross-section of an omnidirectionally bendable multi-directional locomotive module at an end portion in an embodiment herein.

FIG. 3 is an exemplary view of a circular cross-section of the omnidirectionally bendable multi-directional locomotive module at an end portion in an embodiment herein. Each half of the first end (214) is formed by the arrangement of the curved components (112) attached along with the pair of power transmission sprocket chains (218) with the attachment (132) running over the first end (214). The movement of the arrangement of curved components (112) as rotation is achieved by the driving actuator (106) and the sprocket wheel (126) on each end. The rotation path is on each side over the first end (214) the surface length (212), and the second end (216). The first end (214) is formed by the arrangement of the curved components (112) on each side, forming one half of hemisphere on each side. When the driving actuator (106) enables movement of the sprocket wheel (126) along with the pair of power transmission sprocket chains (218) with the arrangement of curved components (112) on each side of the omnidirectionally bendable multi-directional locomotive module over the first end (214), the first end (214) with hemispherical shape enables the omnidirectionally bendable multi-directional locomotive module to achieve wheeled locomotion in forward and backward direction. The omnidirectionally bendable multi-directional locomotive module is in vertical position and the first end (214) acts as a wheeled end. When the driving actuator (106) moves the sprocket wheel (126) in clockwise rotation, the pair of the power transmission sprocket chains (218) along with the arrangement of curved components (112) moves in clockwise direction over the first end (214), surface length (212) and over the second end (216) in rotation, in turn enabling movement of the omnidirectionally bendable multidirectional locomotive module in forward direction. When the driving actuator (106) moves the sprocket wheel (126)) in anti-clockwise rotation, the pair of power transmission sprocket chains (218) along with the arrangement of curved components (112) moves in anti-clockwise direction over the first end (214), the surface length (212) and over the second end (216) in rotation, in turn enabling wheeled locomotion of the omnidirectionally bendable multidirectional locomotive module in backward direction. The first one degree of freedom joint (110A) ad the second one degree of freedom joint (110B), activated by a bending actuator between the two or more circular rigid components (124A), (124B) and (124C) enabling omnidirectional bending of the omnidirectionally bendable multi-directional locomotive module at the two degree of freedom joint when actuated. The arrangement of curved components (112) may or may not overlap each other while moving over the first end (214).

Figure 4:
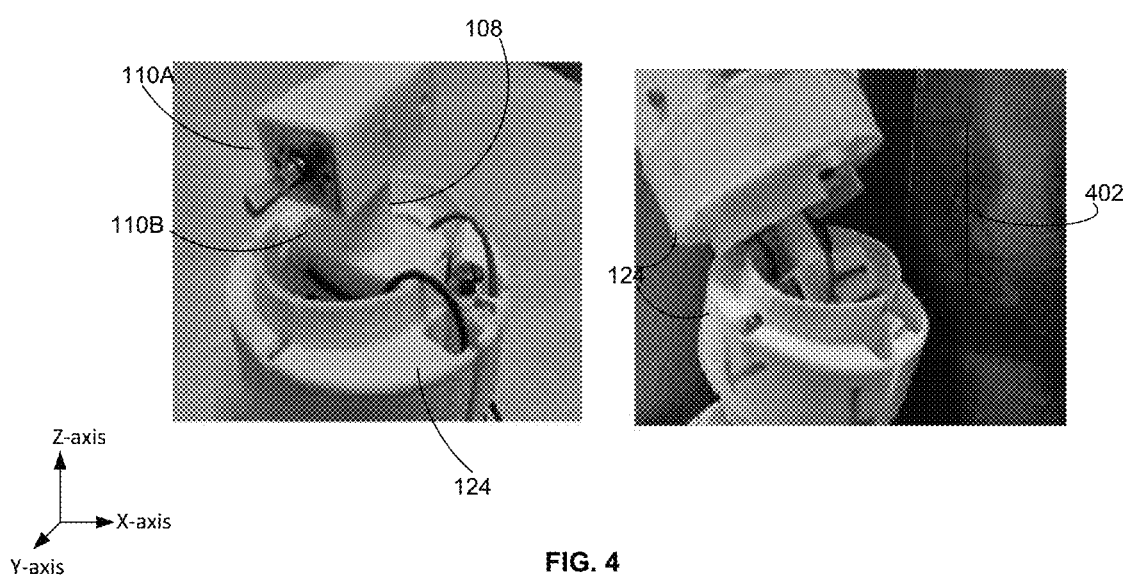
FIG. 4 is an exploded view of one degree of freedom joints aligned at 90 degrees with an offset distance with respect to each other in an embodiment herein.

FIG. 4 is an exploded view of the first one degree of freedom joint (110A) rotationally coupled at 90 degrees with the second one degree of freedom joint (110) with the offset distance (108) with respect to each other enabling a two degree of freedom joint (402) in an embodiment herein. The first one degree of freedom joint (110A) rotationally coupled at 90 degrees with the second one degree of freedom joint (110B) achieve omnidirectional bending upto 90 degree. The first one degree of freedom joint (110A) rotationally coupled at 90 degrees with the second one degree of freedom joint (110B) are incorporated in between the two or more circular rigid components (124A), (124B) and (124C). The mechanism to achieve omnidirectional bending is realized by the collaborative control of the first one degree of freedom joint (110A) and the second one degree of freedom joint (110B) at the rotational point by a bending actuator achieving a two degree of freedom joint (402). The first one degree of freedom joint (110A) and the second one degree of freedom joint (110B) are aligned along the axes inclined at an angle of 90 degree with respect to each other. The two or more circular rigid components (124A), (124B) and (124C) are actuated by the two degree of freedom joint (402) at this point in between the two or more circular rigid components (124A), (124B) and (124C). The offset distance (108) between the first one degree of freedom joint (110A) and the second one degree of freedom joint (110B) achieves significant angular rotations within the constraint of space. The angular rotations of the first one degree of freedom joint (110A) and the second one degree of freedom joint (110B) help to achieve sharp bending of the omnidirectionally bendable multi-directional locomotive module. The two or more circular rigid components (124A), (124B) and (124C) are interconnected by the two degree of freedom joint (402). The arrangement of these two degrees of freedom joints (402) in between two circular rigid components out of the two or more circular rigid components (124A). (124B) and (124C) is seen.

Figure 5:
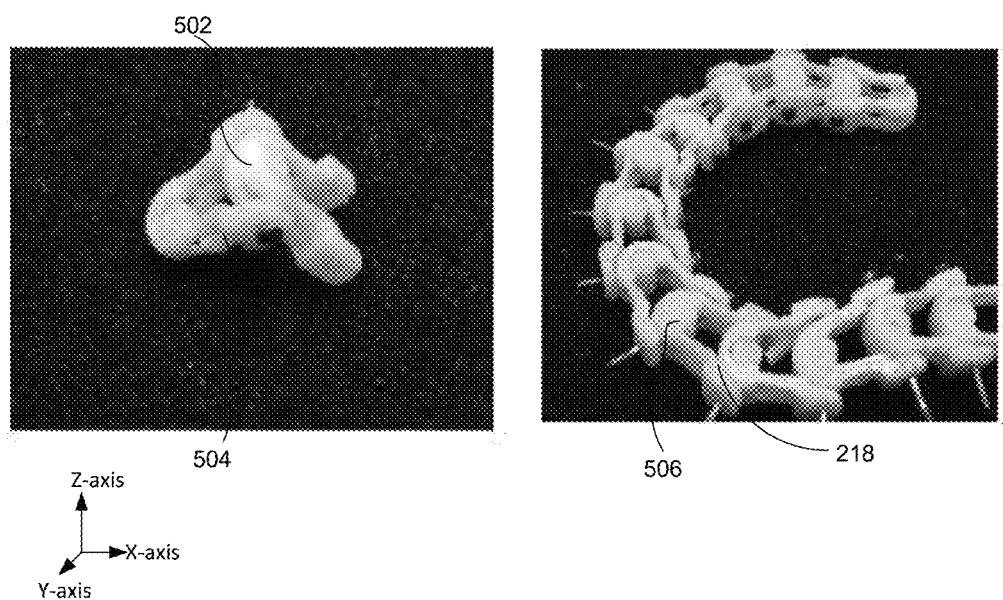
FIG. 5 is a perspective view of a chain vertebra and the arrangement of the chain in an embodiment herein.

FIG. 5 is a perspective view of the pair of power transmission sprocket chains (218), without the curved components (112) according to an embodiment herein. The pair of power transmission sprocket chains (218) includes a chain vertebrae (502) and an arrangement of the chain vertebrae according to an embodiment herein. To comply with the bent body of the omnidirectionally bendable multi-directional locomotive module, two degree of freedom for the pair of power transmission sprocket chains (218) has been designed with degree of freedom about X-axis and Y-axis. The chain vertebrae (502) of the air of power transmission sprocket chains (218) is designed with narrow grooves (504) on its both sides, which adds an extra degree of freedom along the Y-axis. When two consecutive chain vertebrae in the arrangement of the chain vertebrae rotate with respect to each other along the narrow grooves (504), the structure of the pair of power transmission sprocket chains (218) attains bending along the Y-axis axis. a first vertebrae with a first outer surface and a first inner surface and a second vertebrae with a second outer surface and a second inner surfaces. The second outer surface of a second vertebra is coupled to a first inner surface of the first vertebra with two degrees of bending up to the angle of 90 degrees. The first and second vertebrae (502) have rollers (506) and the narrow grooves (504) to facilitate two degrees of freedom bending of the pair of power transmission sprocket chains (218), which passively complies with the omnidirectional bending of the omnidirectionally bendable multidirectional locomotive module. Rollers (506) allow rotation of chain vertebrae (502) relative to each other. The narrow grooves (504) on the chain vertebrae (502) on the other hand enables the pair of power transmission sprocket chains (218) to possess an extra degree of freedom along Z-axis in addition to the degree of freedom along Y-axis.

Figure 6:
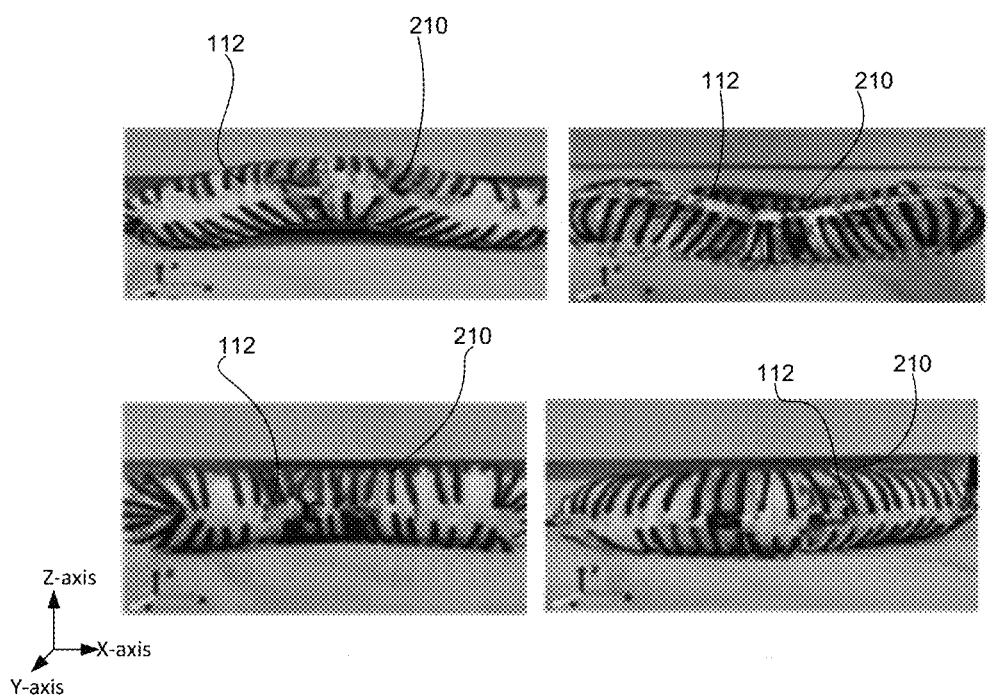
FIG. 6 is a perspective view of bending of omnidirectionally bendable multi-directional locomotive modules about 2 axes in an embodiment herein.

FIG. 6 is a perspective view of bending of the omnidirectionally bendable multi-directional locomotive module about 2 axes according to an embodiment herein. Bending along Y-axis and bending along Z-axis is shown. The pair of power transmission sprocket chains (218) passively complies with the bent surface (210) of the omnidirectionally bendable multi-directional locomotive module. Each curved component (112) rests on each of the chain vertebrae (502) through the attachment (132). The bending of the module along Y and Z axes with the aid of two degree of freedom joint (402) within the omnidirectionally bendable multi-directional locomotive module and the compliance of the pair of power transmission sprocket chains (218) with the bend structure of the omnidirectionally bendable multi-directional locomotive module is shown.

Figure 7:
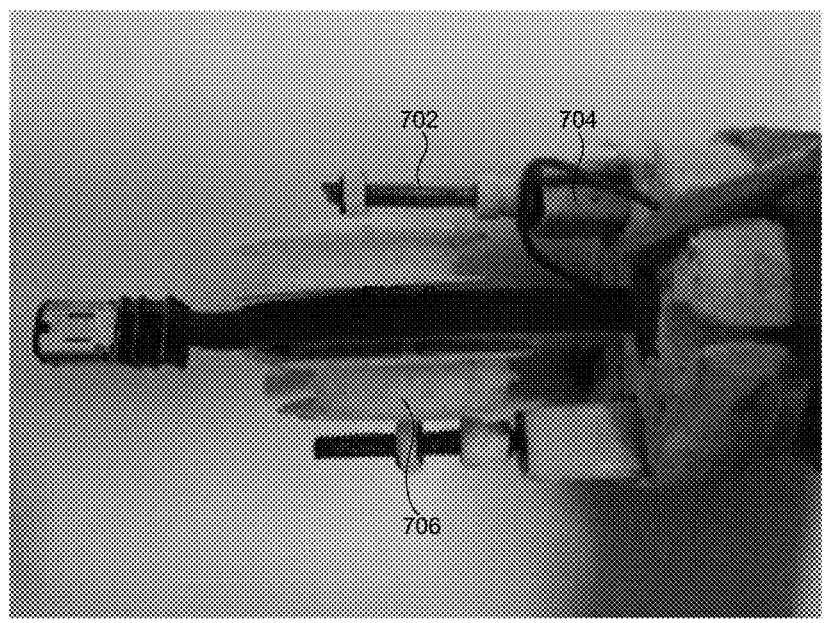
FIG. 7 is an exploded view of a linear actuator mechanism used to adjust the chain tension while body of an omnidirectionally bendable multi-directional locomotive module in bent position in an embodiment herein.

FIG. 7 is an exploded view of the linear actuator (702) used to adjust tension in the pair of power transmission sprocket chains (218) while body of an omnidirectionally bendable multi-directional locomotive module in bent position according to an embodiment herein. To keep the pair of power transmission sprocket chains (218) intact with the bent body of the omnidirectionally bendable multi-directional locomotive module and to maintain optimal tension in the pair of power transmission sprocket chains (218) while crawling in bent position, a mechanism to adjust the tension has been realized using the linear actuator (702). The linear actuator (702) adjusts the position of one of the sprocket wheel (126) corresponding to the pair of power transmission sprocket chains (218), with the slider (116). As the linear actuator (702) rotates, the sprocket wheel (126) slides along the slider (116) and the tension of a corresponding power transmission sprocket chain (218) is adjusted. The arrangement of the linear actuator (702), the sprocket wheel (126), and the slider (116) are shown.

Figure 8:
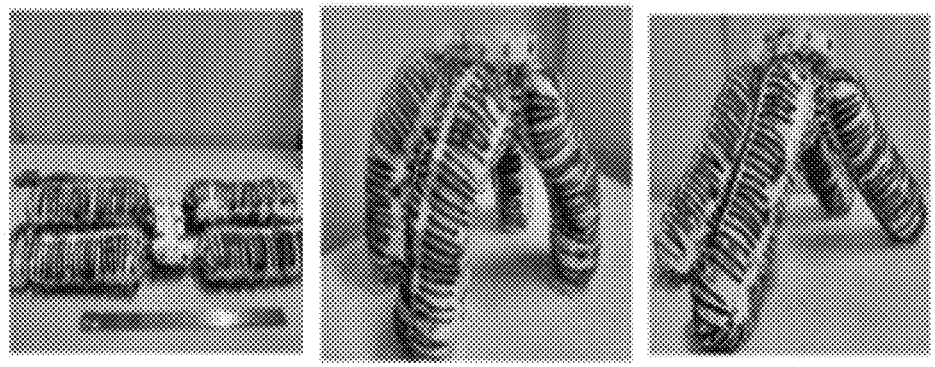
FIG. 8 is an exemplary view of an omnidirectionally bendable multi-directional locomotive assembly in (a) crawler configuration, (b) legged configuration, (c) wheeled configuration in an embodiment herein.

FIG. 8 is an exemplary view of an omnidirectionally bendable multi-directional locomotive assembly in a crawling position (a), a legged position (b), and a wheeled position (c) according to an embodiment herein. In crawling position (a), the omnidirectionally bendable multi-directional locomotive assembly has at least one omnidirectionally bendable multi-directional locomotive module in contact with external surface with the surface length (212) along the body and the movement is backward and forward crawling with the help of the arrangement of curved components (112) and movement of the pair of power transmission sprocket chains (218). Also rolling is enabled in direction perpendicular to the surface length (212). The legged position (b) enables legged locomotion that is achieved by omni directional bending at the two degree of freedom joint of a first omnidirectionally bendable multi-directional locomotive module in synchronization with or alternatively with omni directional bending at the two degree of freedom joint of a second omnidirectionally bendable multi-directional locomotive module. The wheeled position (c) enables wheeled locomotion at hemispherical the first end (214) or second end (216) of the omnidirectionally bendable multi-directional locomotive module.

Figure 9:
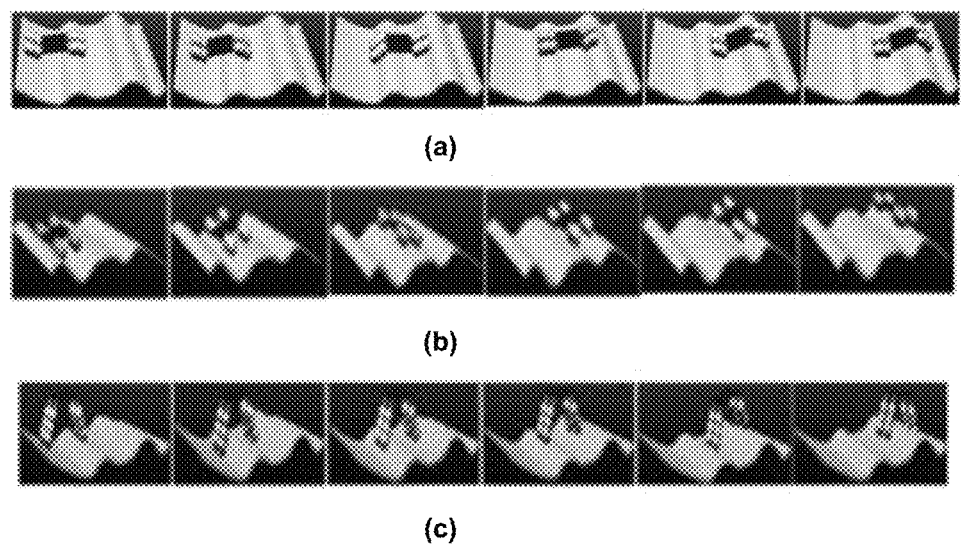
FIG. 9 is an exemplary view of an omnidirectionally bendable multi-directional locomotive assembly when (a) the assembly crawls forward while complying dynamically with the unevenness of surface and climbing at a height less than the length of the module (b) a module rolls sideways on uneven surface, (c) omni-wheel locomotion mode on uneven terrain in an embodiment herein.

FIG. 9 is an exemplary view of omnidirectionally bendable multi-directional locomotive assembly when (a) the assembly crawls forward while complying dynamically with the unevenness of surface and climbing at a height not more than the surface length (212) of the omnidirectionally bendable multi-directional locomotive module forming the assembly (b) one or more of the omnidirectionally bendable multi-directional locomotive modules roll sideways on uneven surface, (c) wheeled locomotion on uneven terrain in an embodiment herein. The omnidirectionally bendable multi-directional locomotive assembly is configured as four legs quadruped omnidirectionally bendable multi-directional locomotive assembly in an example. The omnidirectionally bendable multi-directional locomotive assembly enables hybrid locomotion modes in different configurations. The different configurations for the omnidirectionally bendable multi-directional locomotive assembly include crawler, wheel and legged module modes, as shown in FIG. 8. When the omnidirectionally bendable multi-directional locomotive module crawls with its hemi-spherical the first end (214) or the second end (216) in contact with the surface, the omnidirectionally bendable multi-directional locomotive assembly possesses the characteristics of wheeled locomotion. The simulation results demonstrate the motion of each of these modes on uneven surface, as shown in Fig. a), b) and c). The lumped model of each crawler mode is approximated as a cascade of omnidirectional wheels. The omnidirectionally bendable multi-directional locomotive assembly can be switched form a vertical configuration enabled with wheeled and legged locomotion module to the horizontal configuration enabled with backword and forward crawling locomotion and also sideways rolling locomotion. It is possible to switch the configuration of the omnidirectionally bendable multi-directional locomotive assembly according to the surface, thereby greatly enhancing its capability to traverse dynamically changing surface.

Figure 10:
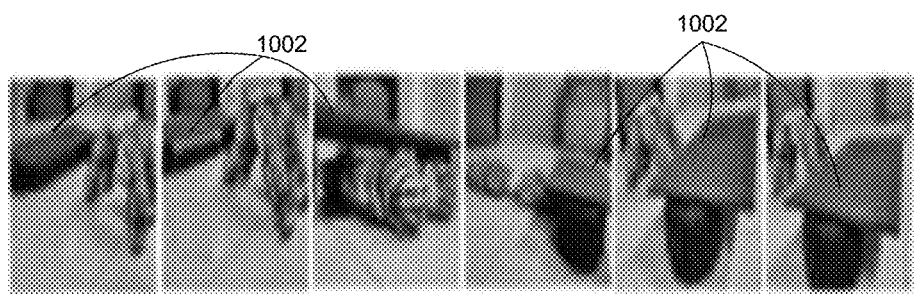
FIG. 10 is an exemplary view where quadruped omnidirectionally bendable multi-directional locomotive module assembly switches its locomotion modes to navigate tight spaces in an embodiment herein.

FIG. 10 is an exemplary view where quadruped omnidirectionally bendable multi-directional locomotive assembly switches its locomotion modes to navigate tight spaces according to an embodiment herein. The first position is either legged position or wheeled position, and the assembly is in vertical position. A obstacle (1002) is lesser in height than the vertical length of the omnidirectionally bendable multi-directional locomotive assembly and has space under it which is more in height than the diameter of one or more of the omnidirectionally bendable multi-directional locomotive modules included in assembly. So, the assembly is switched to crawling position to navigate the obstacle (1002) by crawling under the obstacle (1002). This is an example of versatility that the omnidirectionally bendable multi-directional locomotive module and the assembly thereof.

Figure 11:
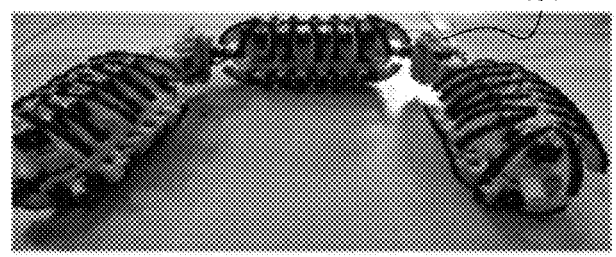
FIG. 11 is an exemplary view of an in-pipeline omnidirectionally bendable multi-directional locomotive module that is realized with a kinematic chain of 3 modules interconnected by 2 torsion spring joints in an embodiment herein.
Figure 11:
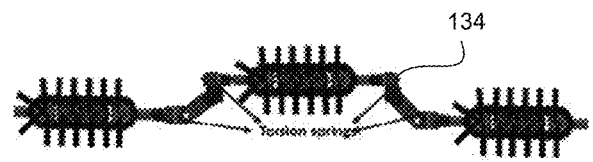

FIG. 11 is an exemplary view of an omnidirectionally bendable multi-directional locomotive assembly that is realized with a kinematic chain of 3 modules interconnected by 2 torsion spring joints according to an embodiment herein. This assembly can be used for in-pipeline assembly, out pipe line assembly, snake robot assembly and wherever such arrangement of modules is necessary. The straight and sideways rolling motion can be performed by the omnidirectional motion capability of one or more of the omnidirectionally bendable multi-directional locomotive modules included in the omnidirectionally bendable multi-directional locomotive assembly, when the links connecting the adjacent the one or more of the omnidirectionally bendable multi-directional locomotive modules are heavy enough to rotate the omnidirectionally bendable multi-directional locomotive modules about the links using the external actuator (134). This eases the locomotion of the omnidirectionally bendable multi-directional locomotive assembly which would otherwise need joint actuations to perform slithering or side winding gaits to move forward or sideways, respectively.

Figure 12:
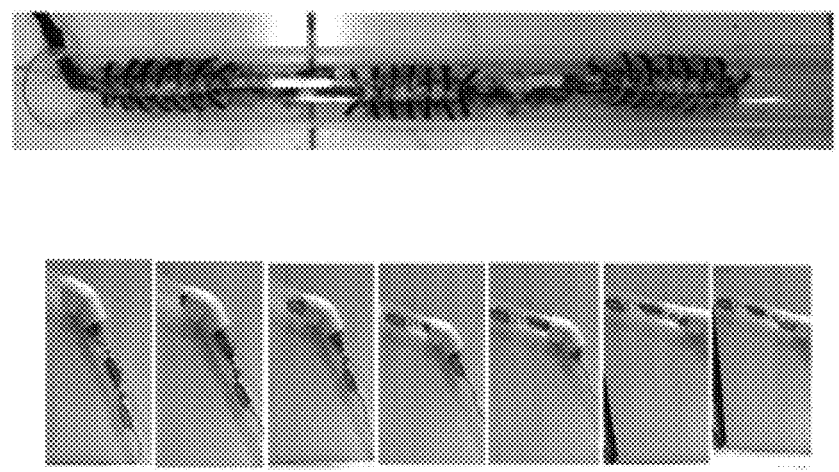
FIG. 12 illustrates an exemplary view of all 3 omnidirectionally bendable multi-directional locomotive modules aligned inline in a straight pipe and are driven synchronously to propagate in forward/backward direction in an embodiment herein.

FIG. 12 illustrates an exemplary view of all 3 omnidirectionally bendable multi-directional locomotive modules aligned inline in a straight pipe and are driven synchronously to propagate in forward and backward direction according to an embodiment herein. The preloaded torsion spring joints provide the necessary clamping force to overcome own body weight of the omnidirectionally bendable multi-directional locomotive modules and facilitate slip free driving motion. The modular configuration of the omnidirectionally bendable multi-directional locomotive modules handles pipe diameter variations and holonomic motion enables alignment of the omnidirectionally bendable multi-directional locomotive modules along the direction of bend. The compliance further facilitates locomotion in sharp bends in small diameter pipes by complying with the curvature of the bend. The omnidirectionally bendable multi-directional locomotive module is able to negotiate planar bends, and also in non-planar bends.

Figure 13:
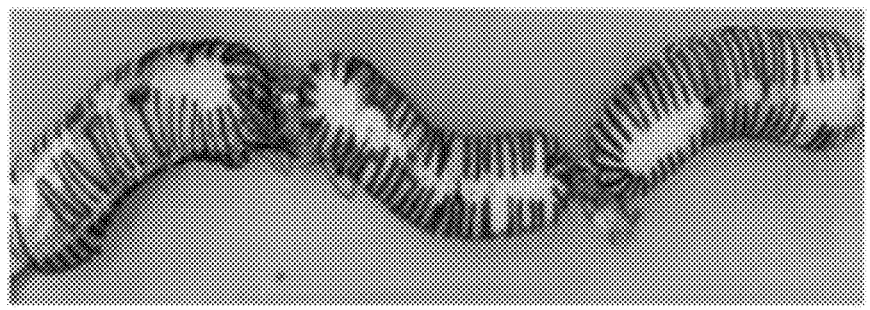
FIG. 13 is an exemplary view of an omnidirectionally bendable multi-directional locomotive snake robot assembly that can be realized with a kinematic chain of the crawler modules in an embodiment herein.

FIG. 13 is an exemplary view of a omnidirectionally bendable multi-directional locomotive snake robot assembly that can be realized with a kinematic chain of the omnidirectionally bendable multi-directional locomotive modules according to an embodiment herein. The potential advantage of the omnidirectionally bendable multi-directional locomotive snake robot assembly using the proposed omnidirectionally bendable multi-directional locomotive module lies in the easy modes of locomotion. Also, the driving actuator (106) located at the front end (214) of a first omnidirectionally bendable multi-directional locomotive module can drive the omnidirectionally bendable multi-directional locomotive snake robot assembly. The two degree of freedom joints (402) enable slithering motion and the external actuator (134) enables sideways rolling of the omnidirectionally bendable multi-directional locomotive module snake robot assembly.

Figure 14:
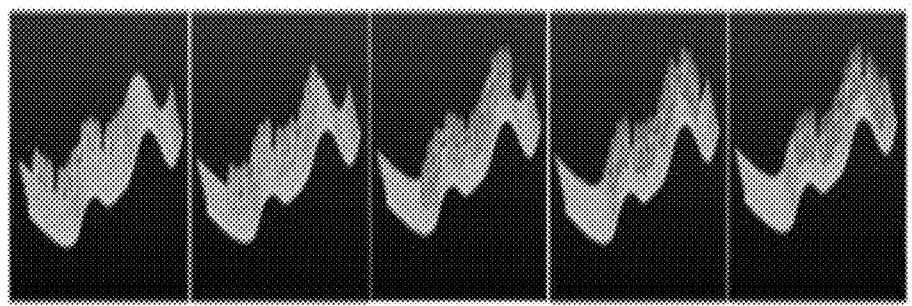
FIG. 14 is an exemplary view illustrating the compliance in the omnidirectionally bendable multi-directional locomotive module that enables an omnidirectionally bendable multi-directional locomotive snake robot assembly traverse uneven field longitudinally according to an embodiment herein.

FIG. 14 is an exemplary view illustrating the compliance in the omnidirectionally bendable multi-directional locomotive module that enables an omnidirectionally bendable multi-directional locomotive snake robot assembly traverse uneven field longitudinally according to an embodiment herein. The height of the obstacles or external uneven surface is less than the length of the omnidirectionally bendable multi-directional locomotive module of the omnidirectionally bendable multi-directional locomotive snake robot assembly. The locomotion is realized by the action of driving actuator and multiple bending actuators in synchronicity with or as a response to external surface. The assembly might be controlled manually, by teleoperation or by sensors.

Figure 15:
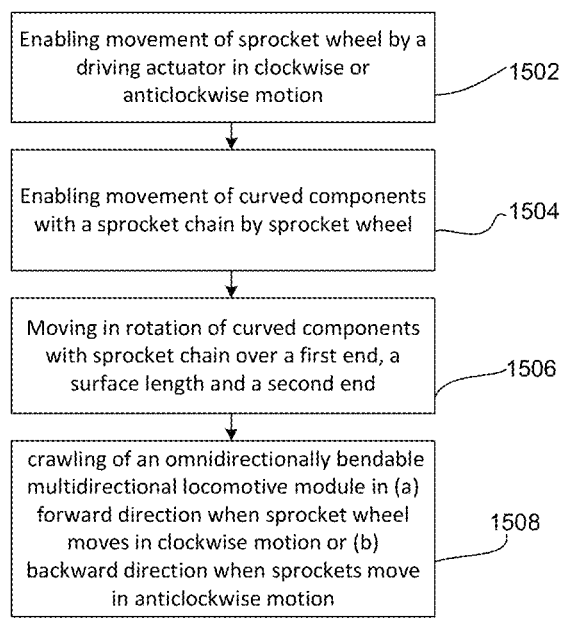
FIG. 15 is a flow diagram explaining the steps of activation of forward and backward crawling locomotion of omnidirectionally bendable multi-directional locomotive module, in an embodiment herein.

FIG. 15 is a flow diagram explaining the steps of activation of forward and backward crawling locomotion of omnidirectionally bendable multi-directional locomotive module, in an embodiment herein. At step 1502, the driving actuator (106) enables movement of the sprocket wheel (126). At step 1504, the sprocket wheel (126) enables movement of the pair of power transmission sprocket chains (218) with the arrangement of curved components (112). At step 1506, the pair of power transmission sprocket chains (218) with the arrangement of curved components (112) moves in rotation over a first end (214), a surface length (212) and a second end (216). At step 1508, an omnidirectionally bendable multidirectional locomotive module moves in crawling locomotion in backward or forward direction based on the direction of movement of the pair of power transmission sprocket chains 218)) over the sprocket wheel (126).

Figure 16:
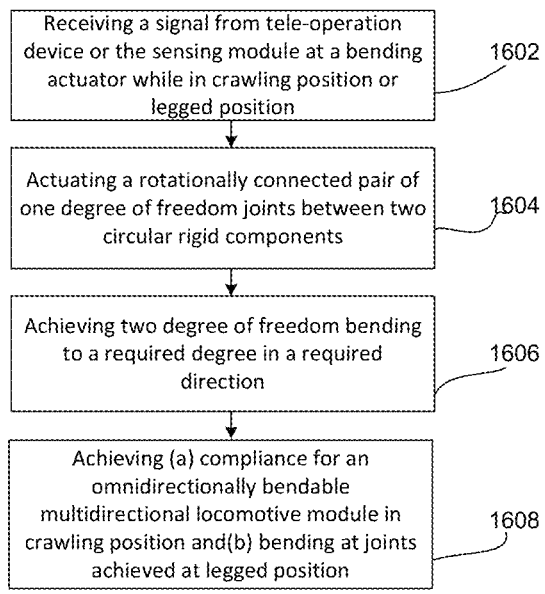
FIG. 16 is a flow diagram explaining the steps of omnidirectionally bendable multi-directional locomotive module achieving compliance along with an external uneven surface, in an embodiment herein.

FIG. 16 is a flow diagram explaining the steps of the omnidirectionally bendable multi-directional locomotive module achieving compliance along with an external uneven surface, in an embodiment herein. At step 1602, a bending actuator receives signal from a tele-operation device or the sensing module, while in crawling position or legged position. At step 1604, a rotationally connected pair of one degree of freedom joints (110A) and (110B) are actuated between two circular rigid components of the two or more circular rigid components (124A. (124B) and (124C). At step 1606, two degree of freedom bending achieved to a required degree in a required direction. At step 1608, compliance achieved for a the omnidirectionally bendable multidirectional locomotive module in crawling position and bending at the two degree of freedom joints (402) achieved at legged position.

Figure 17:
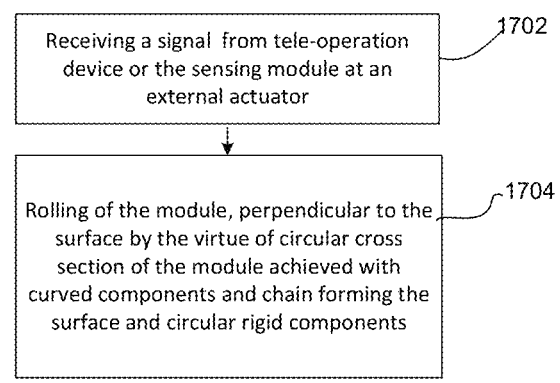
FIG. 17 is a flow diagram explaining the steps of activation of rolling of omnidirectionally bendable multi-directional locomotive module, in an embodiment herein.

FIG. 17 is a flow diagram explaining the steps of activation of rolling of omnidirectionally bendable multi-directional locomotive module, in an embodiment herein. At step 1702, the external actuator (134) receives a signal from a tele-operation device or a sensing module, at step 1704, rolling of the omnidirectionally bendable multi-directional locomotive module, perpendicular to the surface is achieved-by the virtue of circular cross section of the omnidirectionally bendable multidirectional locomotive module, achieved with arrangement of curved components (112) and the pair of power transmission sprocket chains (218) forming the surface (210) over the two or more circular rigid components (124A), (124B) and (124C).

The Omnidirectionally bendable multidirectional locomotive module facilitates compliant high traction surface actuation with reduced number of driving actuators. Single driving actuator is capable of driving the omnidirectionally bendable multidirectional locomotive module or an omnidirectionally bendable multidirectional locomotive assembly. With the combination of internal compliance and a driving actuator the omnidirectionally bendable multidirectional locomotive module is capable of forward, backward locomotion and differential locomotion. The omnidirectionally bendable multidirectional locomotive module possesses advantages of crawling over holes and ability to smooth out the path, putting low pressure on terrain and providing large ground contact surface and traction. An omnidirectionally bendable multidirectional locomotive module achieves versatility, owing to the compliance on an uneven surface and omnidirectional crawling, and which enhances its capabilities to exhibit various locomotive traits in different configurations of the robot assembly, which incorporates this module. The versatility of the modular design of the module facilitates its integration with various categories of robot assembly, not limited by a reconfigurable search and rescue robot assembly, in-pipe climbing assembly, out pipe climbing robot assembly, tree climbing assembly, leakage detection assembly, quadruped assembly, snake robot assembly, robotic manipulator, legged robot assembly, humanoid limb prosthesis for walking, crawling, wheeled locomotion, prosthetic gripper assembly with modular fingers. The modular design provides potential advantages of attaining varying configurations and achieving hybrid locomotion modes in a dynamically changing environment. Therefore, a combination of modularity, active compliance and omnidirectional motion enables it to navigate a wide range of surfaces.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A multidirectional locomotive module with omnidirectional bending that is compliant along multiple axis, comprises:
   a first part that comprises:
      a first circular rigid component, a second circular rigid component and a third circular rigid component, wherein the first circular rigid component is coupled to the second circular rigid component using a first two degree of freedom joint, wherein the second circular rigid component is coupled to the third circular rigid component using a second two degree of freedom joint, wherein the first two degree of freedom joint is aligned along the X and Y axes and the second two degree of freedom joint along the Y-axis and the X-axis of the multidirectional locomotive module;
      a first pair of bending actuators that are connected to the first two degree of freedom joint and a second pair of bending actuators that are connected to the second two degree of freedom joint, wherein the first and the second pair bending actuators receive a signal from an external device or a sensing module when the multidirectional locomotive module is in operation and actuates the first or the second two degree of freedom joint that enables bending of the multidirectional locomotive module to an angle ranging from 0 to 90 degrees about a Z-axis in a direction to achieve (a) surface compliance with an external surface when the multidirectional locomotive module is in a crawling position along the X-axis or (b) bending to an angle in a range of 0 to 90 degrees in a direction when the multidirectional locomotive module is in a vertical locomotion position; and
      a sprocket wheel:
   a second part that is elongated in shape with circular cross-section along a length and hemispherical in shape at a first end and a second end of the multidirectional locomotive module, wherein the second part comprises:
      a power transmission sprocket chain, that runs over the sprocket wheel, wherein the power transmission sprocket chain is compliant along the X-axis, the Y-axis and the Z-axis; and
      curved components coupled with the power transmission sprocket chain, wherein the curved components comprise curvature that in turn, along with the power transmission sprocket chain form circular cross-section of the second part along the length and hemispherical shape at the first end and the second end.

2. The multidirectional locomotive module according to claim 1, wherein the locomotive module comprises a driving actuator, wherein the driving actuator enables a movement of the sprocket wheel in clockwise or anticlockwise motion, which in turn enables a movement of the curved components with the power transmission sprocket chain in a rotation over the first end, the surface length and the second end to enable,
   (A) crawling of the multidirectional locomotive module in
      (a) forward direction when the sprocket wheel moves in clockwise motion or
      (b) backward direction when the sprocket wheel moves in anticlockwise motion, when the multidirectional locomotive module is in crawling position with the length in contact with external surface along the X-axis; or (B) wheeled locomotion of the multidirectional locomotive module in (a) forward direction when the sprocket wheel moves in clockwise motion or (b) backward direction when the sprocket wheel moves in anticlockwise motion, when the multidirectional locomotive module is in vertical locomotion position and the first end or the second end is a wheeled end.

3. The multidirectional locomotive module according to claim 1, wherein the multidirectional locomotive module comprises an external actuator which enables rolling of the multidirectional locomotive module perpendicular to the length.

4. The multidirectional locomotive module according to claim 1, wherein the multidirectional locomotive module comprises a linear actuator to optimize tension in the power transmission sprocket chain when the multidirectional locomotive module is in a bent surface compliant position, to enable forward and backward crawling motion of the multidirectional locomotive module.

5. The multidirectional locomotive module according to claim 1, wherein the multidirectional locomotive module comprises a compliant component, wherein the compliant component is adapted between the first circular rigid component and the second circular rigid component or the third circular rigid component.

6. The multidirectional locomotive module with omnidirectional bending according to claim 1, wherein the compliant component is rubber, spring or silicone.

7. The multidirectional locomotive module with omnidirectional bending according to claim 1, wherein the curved components comprise protrusions to provide added traction.

8. The multidirectional locomotive module according to claim 1, wherein the power transmission sprocket chain comprises the curved components with attachments for surface locomotion, wherein the power transmission sprocket chain is made of a cascading vertebrae arrangement which comprises a first vertebrae with a first outer surface and a first inner surface and a second vertebrae with a second outer surface and a second inner surface, wherein the second outer surface of a second vertebra is coupled to a first inner surface of the first vertebra with two degrees of bending up to the angle of 90 degrees, wherein the first and second vertebrae have rollers and precision grooves to facilitate two degrees of freedom bending of the power transmission sprocket chain wherein the power transmission sprocket chain passively complies to the omnidirectional bending of the multidirectional locomotive module to enable high traction motion in bent position.

9. A multidirectional locomotive module assembly comprising more than one multidirectional locomotive module with omnidirectional bending as claimed in claim 1, wherein the multidirectional locomotive module assembly enables hybrid locomotion modes based on the orientation of more than one multidirectional locomotive modules.

10. The multidirectional locomotive module assembly according to claim 9, wherein the multidirectional locomotive module assembly comprises a multidirectional locomotive module with omnidirectional bending, wherein the first end of the multidirectional locomotive module is a wheel end, to enable wheeled movement in backward and forward direction with the multidirectional locomotive module with omnidirectional bending in the vertical locomotion position.

11. The multidirectional locomotive module assembly according to claim 9, wherein the multidirectional locomotive module assembly comprises a first multidirectional locomotive module, wherein at least one end of the first multidirectional locomotive module is configured to a second multidirectional locomotive module along a longitudinal axis to facilitate a set of forward and backward crawling, omni directional compliant locomotion, and sideways rolling locomotion when the multidirectional locomotive module is in contact with external surface along the length.

12. The multidirectional locomotive module assembly according to claim 9, wherein the assembly facilitates a switch between a first longitudinal position and a second vertical position, wherein the first longitudinal position enables forward and backward crawling, omnidirectionally compliant locomotion along the length and sideways rolling locomotion perpendicular to the length and the second vertical position enables set of omnidirectional bending, legged and wheeled locomotion.

13. The multidirectional locomotive module assembly according to claim 9, wherein the multidirectional locomotive module assembly comprises a plurality of multidirectional locomotive modules with omnidirectional bending; and an external actuator, wherein the external actuator is coupled with the first end or the second end of the plurality of multidirectional locomotive modules with omnidirectional bending to enable a holonomic motion.

14. The multidirectional locomotive module assembly according to claim 9, wherein the assembly comprises a plurality of multidirectional locomotive modules coupled to each other at the first end or the second end to enable a backward and forward motion along the length, bending along multiple axis, and a rolling motion along the axis perpendicular to the length to enable a snake robot assembly.

15. The multidirectional locomotive module assembly according to claim 9, wherein the multidirectional locomotive module assembly comprises a plurality of multidirectional locomotive modules coupled to each other at the first end or the second end with at least one compliant link to enable a backward & forward crawling locomotion, a bending, and a rolling motion to enable an in-pipe climbing robot arrangement, wherein at least one of the 2-degree of freedom joints of the plurality of multidirectional locomotive modules is actuated, wherein the actuation of the two degree of freedom joint enables the surface compliance of the assembly according to a direction and a curvature of a pipe, in turn enables the assembly to take sharp turns in small diameter pipes.

16. The multidirectional locomotive module with omnidirectional bending according to claim 9, wherein the multidirectional locomotive module with omnidirectional bending is a humanoid limb.

17. The multidirectional locomotive module assembly according to claim 9, wherein the multidirectional locomotive module assembly is a tree climbing robot assembly or an out pipe climbing robot assembly.

18. The multidirectional locomotive module assembly according to claim 9, wherein the multidirectional locomotive module assembly is a prosthesis with the multidirectional locomotive module with omnidirectional bending acting as a gripper.

19. The multidirectional locomotive module assembly according to claim 9, wherein the multidirectional locomotive module assembly is a reconfigurable search and rescue robot assembly.

20. The multidirectional locomotive module assembly according to claim 9, wherein the multidirectional locomotive module assembly is a pipe leakage detection robot assembly.

* * * * *